US008186699B2

(12) United States Patent
Green

(10) Patent No.: US 8,186,699 B2
(45) Date of Patent: May 29, 2012

(54) WHEELCHAIR LEVER DRIVE SYSTEM

(75) Inventor: Steve C. Green, West Fork, AR (US)

(73) Assignee: Steve Green, West Fork, AR (US)

( * ) Notice: Subject to any disclaimer, the term of this patent is extended or adjusted under 35 U.S.C. 154(b) by 78 days.

(21) Appl. No.: 12/198,521

(22) Filed: Dec. 18, 2008

(65) Prior Publication Data

US 2010/0156063 A1 Jun. 24, 2010

(51) Int. Cl.
*B62M 1/14* (2006.01)

(52) U.S. Cl. .................................. 280/242.1; 280/304.1

(58) Field of Classification Search ............... 280/242.1, 280/252, 250.1, 253, 244, 256, 27, 236–238, 280/247, 304.1

See application file for complete search history.

(56) References Cited

U.S. PATENT DOCUMENTS

| | | | | | |
|---|---|---|---|---|---|
| 838,228 | A | * | 12/1906 | Williams | 280/7.15 |
| 4,429,598 | A | | 2/1984 | Tucker | |
| 4,457,416 | A | | 7/1984 | Kutzler | |
| 4,652,026 | A | | 3/1987 | Burge | |
| 4,735,431 | A | | 4/1988 | Tait | |
| 4,762,332 | A | | 8/1988 | Seol | |
| 4,840,076 | A | | 6/1989 | Brubaker | |
| 4,865,344 | A | * | 9/1989 | Romero et al. | 280/255 |
| 4,867,292 | A | | 9/1989 | Hartig | |
| 5,007,655 | A | | 4/1991 | Hanna | |
| 5,052,533 | A | | 10/1991 | Carey | |
| 5,101,946 | A | | 4/1992 | Lederman | |
| 5,167,168 | A | * | 12/1992 | Beumer | 74/810.1 |
| 5,657,836 | A | * | 8/1997 | BeVier | 188/2 F |
| 5,765,669 | A | | 6/1998 | Adams | |
| 6,158,757 | A | | 12/2000 | Tidcomb | |
| 6,210,300 | B1 | | 4/2001 | Costin | |
| 6,234,504 | B1 | | 5/2001 | Taylor | |
| 6,715,780 | B2 | | 4/2004 | Schaeffer | |
| 6,755,430 | B1 | * | 6/2004 | Watwood et al. | 280/250.1 |
| 6,953,412 | B2 | | 10/2005 | Braford | |
| 7,261,309 | B2 | * | 8/2007 | Watwood et al. | 280/244 |
| 7,677,586 | B2 | * | 3/2010 | Bloom | 280/250.1 |
| 2004/0104554 | A1 | * | 6/2004 | Watwood et al. | 280/250.1 |
| 2006/0208452 | A1 | * | 9/2006 | Mittelstaedt | 280/250.1 |
| 2007/0024021 | A1 | * | 2/2007 | Rand et al. | 280/252 |
| 2007/0052196 | A1 | * | 3/2007 | Taylor | 280/250.1 |
| 2008/0238022 | A1 | * | 10/2008 | Kylstra et al. | 280/244 |

* cited by examiner

*Primary Examiner* — Tashiana Adams

(57) ABSTRACT

A manual propulsion mechanism for wheelchairs utilizes a lever pivotally mounted to the hub of each rear wheel such that the wheelchair user can propel the chair with push/pull movements of the levers. Forward and reverse propulsion directions are accomplished by a system of one-way reversible clutches contained in the propulsion wheel hubs which also allow the levers to be operationally disconnected such that the chair can freewheel. Operator control of direction shifting is through pivoting motions imparted to the grip handles of the propulsion levers. In a preferred embodiment, improved ergonomics for propulsion direction changes are made possible by coordinating the direction of the shift pivot motion with the push/pull movement of the levers. This allows the operator to retain a comfortable, stable grip on the grip handle while simultaneously propelling and controlling direction of movement.

12 Claims, 8 Drawing Sheets

WHEELCHAIR LEVER DRIVE SYSTEM

CROSS-REFERENCE TO RELATED APPLICATIONS

Not Applicable

STATEMENT REGARDING FEDERALLY SPONSORED R&D

Not Applicable

REFERENCE TO SEQUENCE LISTING OR COMPUTER PROGRAM

Not Applicable

This invention relates to manual wheelchair drive mechanisms.

BACKGROUND OF THE INVENTION

Wheelchairs are typically intended to provide independent mobility for persons without the use of their legs, and provide means of utilizing arm movement to cause rotation of one or more wheels of the wheelchair. In the commonest and simplest form, round pushrims of slightly smaller diameter than the propelling wheels are fixed to the said propelling wheels, such that the user may conveniently grasp the pushrims to exert a rotational torque to the driving wheels through the pushrims. Although such means of propelling is simple, light in weight, and inexpensive, problems with pushrims include placing the users hand near the tires of the driving wheels which may be dirty, requiring considerable grip strength to grasp the pushrim, and repetitive motion injuries from the non-optimal bio-mechanics of grasping and pushing the pushrims. Efforts to provide solutions to these problems have often included lever drive mechanisms that allow the user to propel with reciprocating rowing type of motion. The levers can be located such that the pushing and pulling on the grip portion of the input lever provides improved biomechanics and keeps the users hand away from the driving wheels. Torque transmission from the input lever to the driving wheels typically involves some type of clutch action such that the wheelchair can be propelled in both forward and reverse directions. In this type of drive mechanism a means must be provided to allow the user to select either forward or reverse, and also to disengage the drive mechanism so that the wheelchair can be pushed by a caregiver.

PRIOR ART

To this point in the state of the art, lever drive mechanisms have all had deficiencies that limit general acceptance by potential users. These deficiencies include being too heavy, too bulky, having non-ergonomic forward/reverse shifting control inputs, and being obtrusive in appearance. Many levers drive inventions depend on a lever that is pivotally mounted forward of the rear drive wheels and that transmits torque to the drive wheels by way of chains, belts, or gear racks. Representative of this type of lever drive arrangement are U.S. Pat. Nos. 6,234,504, 5,007,655, and 4,652,026. This style of lever drive is exceptionally obtrusive in appearance, needlessly heavy, and has not been accepted by the user community.

Another style of lever drive incorporates the drive lever pivot spindle into the rear drive wheel hub. Although potentially less obtrusive than the forward mount lever arrangement discussed above, the bulky physical size of current hub mount lever drive mechanisms causes them to be placed on the outside of the driving wheel, and thus are still objectionably obtusive. Additionally, this placement causes the width of the wheelchair to increase, which is problematic for passing through typical doorways. U.S. Pat. No. 7,261,309 shows a wheelchair lever drive that is placed on the outside of each rear drive wheel. It uses roller clutches to effect forward/reverse directional control that are shifted in rotational sense by a handgrip 47 actuated pinion 17 that runs against a mating gear portion 2A on shift cage 2 of the clutch in the transmission. The relative pitch diameters necessary to the use of this pinion/gear arrangement result in less angular movement of shift cage 2 than is input by handgrip 47. Further, the connection between handgrip 47 and pinion 17 is cable 49. This arrangement causes the torsional compliance of cable 49 to add angular lost motion to the shift angle input the user must apply to the handgrip. This results in an awkwardly large angle through which the user must rotate the handgrip in order to affect change of direction, forward/reverse or reverse/forward shifts. In wheelchair operation change of direction shifts are very frequent, and this large angle of rotation forces the user to continually adjust their hand position on the grip of the propulsion lever. This condition significantly impairs the user experience, and predisposes users to forego using a lever drive wheelchair, other benefits notwithstanding. Additionally this invention uses multiple springs 5 of unusual and complex shape to cause rollers 3 to contact cam points 52 of cam disc 50 portion of the mechanism. Cam points 52 are of complex geometry and require high precision machining and grinding processes to fabricate. This results in an expensive clutch and control arrangement, not well suited to low production uses such as wheelchairs.

Various roller clutch mechanisms are known to the art, but fail to adequately address wheelchair lever drive needs. U.S. Pat. No. 6,210,300 presents a roller clutch invention that uses formed cam surfaces on the inside diameter portion of the outer member of the clutch, with the rollers biased by individual springs. This type of clutch is complex and problematically expensive to manufacture in small quantities for wheelchair applications.

U.S. Pat. No. 6,953,412 discloses a reversible one-way clutch which incorporates cammed surfaces on either the outer periphery of an inner race, or the inner periphery of an outer race, in combination with cylindrical rollers, a cage portion containing said rollers and biasing springs for each roller, and a biasing plate 96 which functions to move the bias springs such that the clutch functions in either forward or reverse. It also, like other similar one-way reversible clutches, depends on a plurality of individual springs, 114, generally either one or two per roller, to achieve torque transmission in a selectable direction of rotation. Due to the dependence on individual springs for roller biasing, the arrangement thus taught is limited to a bi-state operation, as the springs will push the rollers either one direction on the other, and are not intended or able to achieve an intermediate position. Therefore, either CW torque transmission with freewheeling CCW is achieved, or CCW torque transmission with freewheeling CW, thus lacking a neutral position allowing freewheeling both CW and CCW. Unique to this arrangement is the further incorporation of a biasing plate 96 to effect movement of the plurality of springs from one torque transmission state to the reverse. This arrangement as presented is of greater complexity and cost than is needed for wheelchair transmissions.

U.S. Pat. No. 5,765,669 teaches a reversible clutch type mechanism with features similar to U.S. Pat. No. 6,953,412 and U.S. Pat. No. 6,210,300 in that it incorporates rollers that can be positioned such that torque transmission in selected direction can be achieved. It also use a complex formed spring cage to position the rollers with respect to the cammed surfaces.

State of the art lever drives, such as taught by U.S. Pat. No. 7,261,309, typically use a lever grip arrangement in which the grip interfaces for the user's hands are placed coaxially with the long axis of the lever. This arrangement is inherently biomechanically sub-optimal, in that it requires an unnecessarily large flexure of the wrist during the push/pull propulsion motion. Additionally, by using a rotation of the grip interface to effect forward/reverse shifting, it further causes the user wrists to be placed at non-optimal angles relative to the stress of pushing and pulling for propulsion.

Consequently it may be seen that many inventions relating to lever drive wheelchair propulsion, and reversible clutching mechanisms utilizing rollers, springs, cages, and cammed surfaces are known. However, the specific biomechanical challenges of manual wheelchair propulsion by lever drive have not adequately addressed by the state of the art.

BRIEF SUMMARY OF THE INVENTION

The present invention furthers the state of the art by providing a lever propulsion direction selection means for manual wheelchairs that allows improved biomechanics of directional control shifting, forward/reverse and reverse/forward. Operator directional control input through the pivoting of the propulsion lever handgrip uses intuitive pivoting motions which result in a reduced user training period and more confident control of the wheelchair. Precise control of wheelchair positioning is further improved by incorporation of simple brake operation means into the handgrip interface as a rotation of the handgrip.

This pivoting handgrip directional shifting combined with brake operation by handgrip rotation allows the operator to maintain a non-changing hand grip position such that propulsion movement of the levers may be comfortably simultaneous with direction shifting and braking.

OBJECTS OF THE INVENTION

It is therefore an object of this invention to provide a wheelchair lever drive propulsion mechanism that addresses the shortcomings in the state of the art mentioned above.

A further object of this invention is to provide a method to propel a wheelchair by means of a lever which can selectively rotate the wheelchair drive wheels either forward or reverse by the respective push or pull stroke of the lever, as well as a means to decouple the lever such that the wheelchair can freewheel, be propelled by conventional pushrims, or be moved by a caregiver.

A further object of this invention is to provide a lever drive propulsion mechanism that does not increase the width of the wheelchair.

A further object of this invention is to provide a lever drive propulsion mechanism that is positioned to the inside of the rear wheels of the wheelchair.

A further object of this invention is to provide an ergonomically and biomechanically improved method of selecting the direction of lever drive wheelchair propulsion.

A further object of the invention is to provide a reversible one-way roller clutch system that can be shifted from one direction of rotation to the reverse of that by a pivoting control movement of the lever handgrip.

A further object of the invention is to provide a reversible one-way roller clutch system that provides a neutral position in which the clutch input and output elements can freewheel with respect to each other in either direction of rotation.

Another object of the invention is to provide a spring urged shifting mechanism that will maintain the reversible clutch in constant engagement in either forward or reverse position.

Another object of the invention is to provide a shifter over-travel compensation means that will protect the reversible clutch shifting mechanism from damage by shift input motions of excessive excursion and force.

Another object of the invention is provide a handgrip by which by which a user of the invention can change the relative sense of the propulsion rotation, select a transmission neutral which decouples the levers from the propelling wheels, and can effect braking of the wheelchair.

BRIEF DESCRIPTION OF SEVERAL VIEWS OF THE INVENTION

Figure 4:
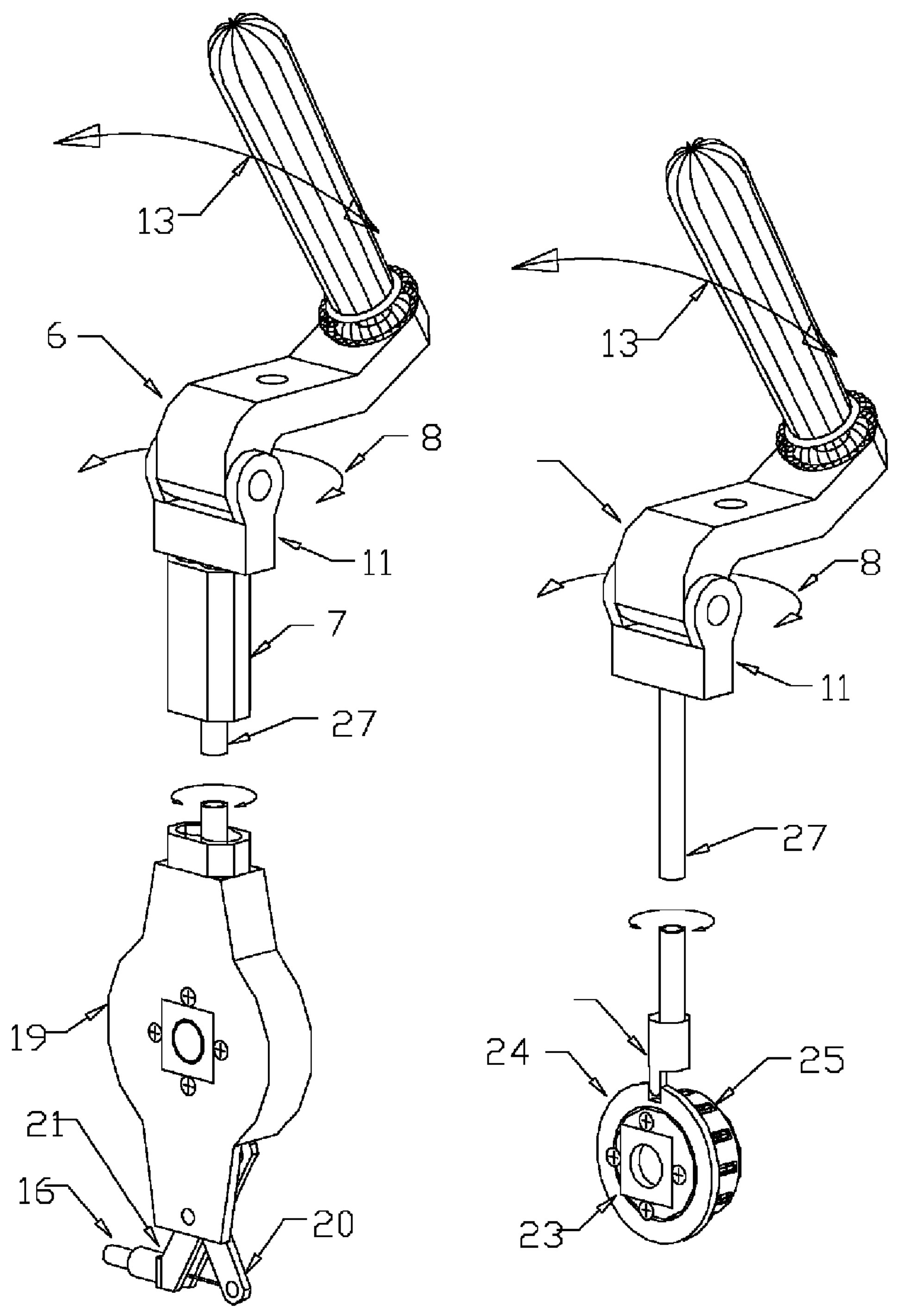

FIG. 4 contains two perspective views of a left side lever drive system with some components removed for clarity in illustrating the shifting system.

Figure 5:
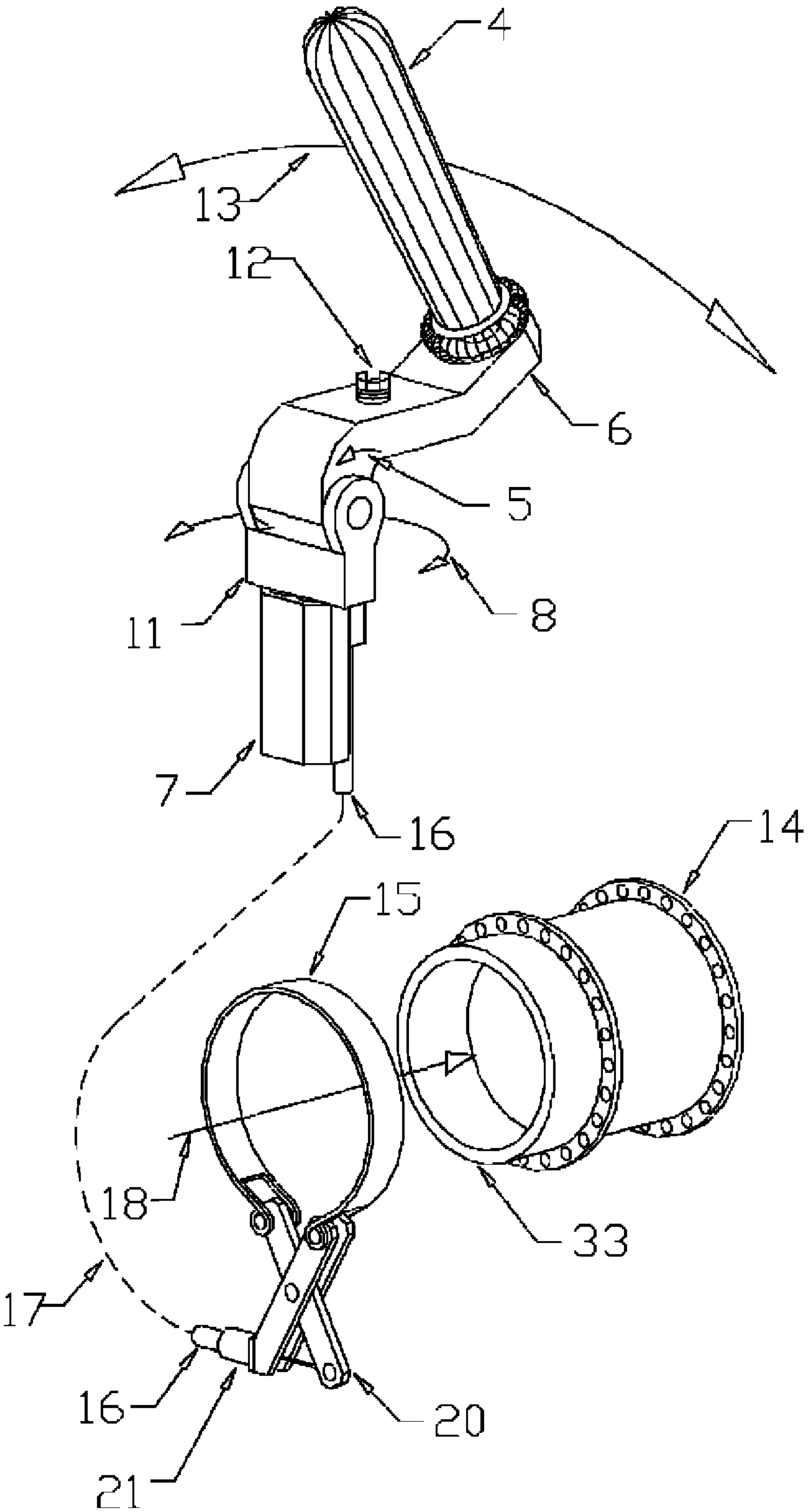

FIG. 5 is perspective view of the lever drive system with some components removed to illustrate the brake design.

Figure 6A:
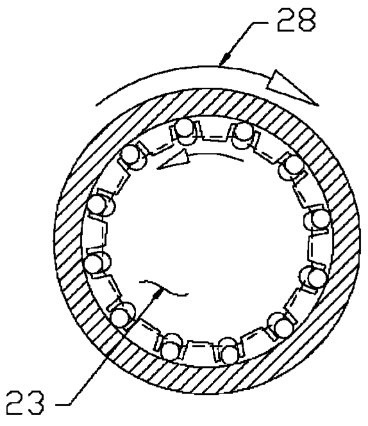

FIG. 6A shows the reversible clutch detail with the clutch shifted to transmit CW torque while overrunning in the CCW direction.

Figure 6B:
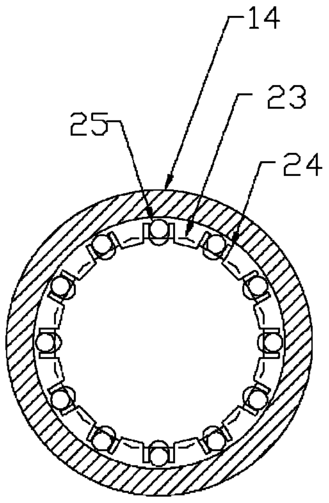

FIG. 6B shows the reversible clutch detail with the clutch shifted to neutral position in which it will overrun in both CW and CCW directions.

Figure 6C:
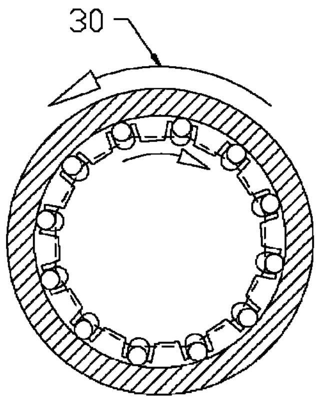

FIG. 6C shows the reversible clutch detail with the clutch shifted to transmit CCW torque while overrunning in the CW direction.

Figure 7:
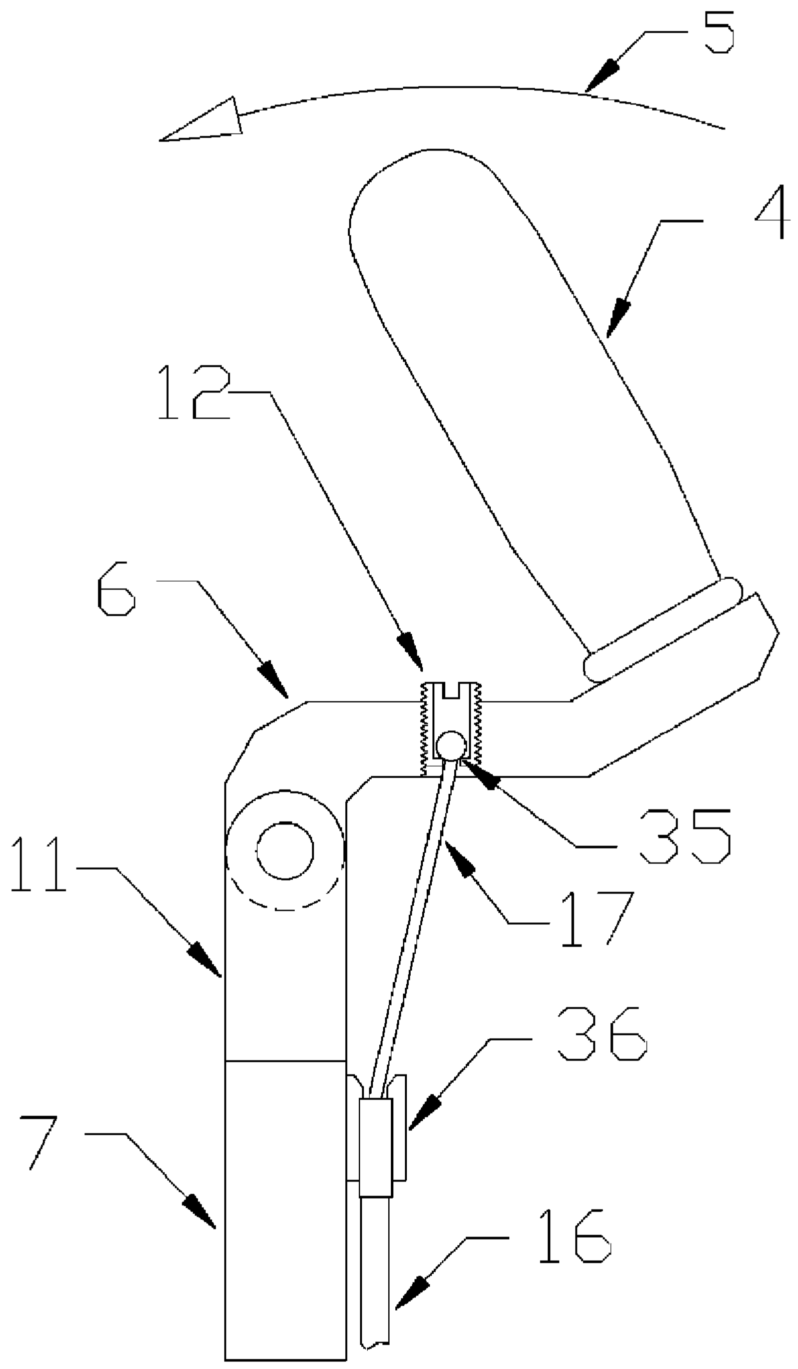

FIG. 7 is side view with a partial cutaway to illustrate adjustment of the brake cable.

FIG. 8 shows two views illustrating the design of the shift overtravel compensation system.

DETAILED DESCRIPTION OF THE INVENTION

Figure 1:
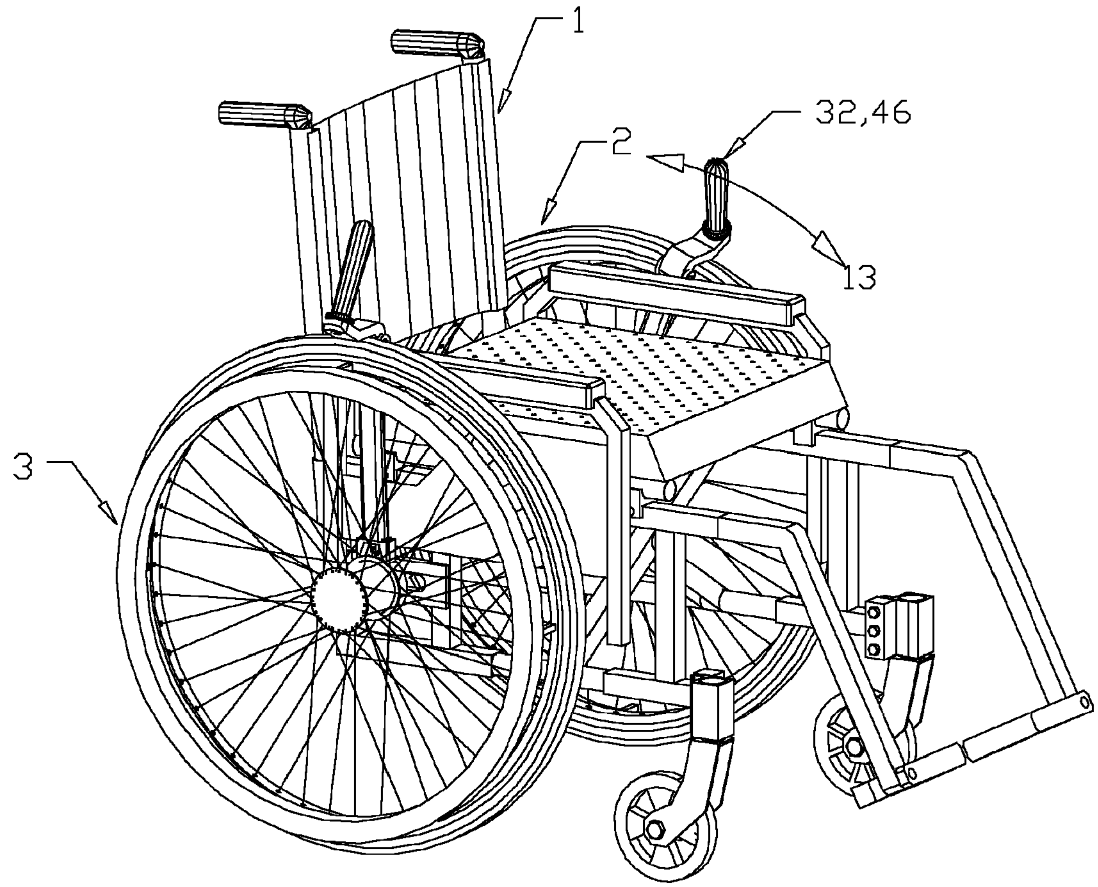
FIG. 1 is a perspective view from the right side of a typical manual wheelchair frame with the lever drive system of this invention installed.
Figure 2:
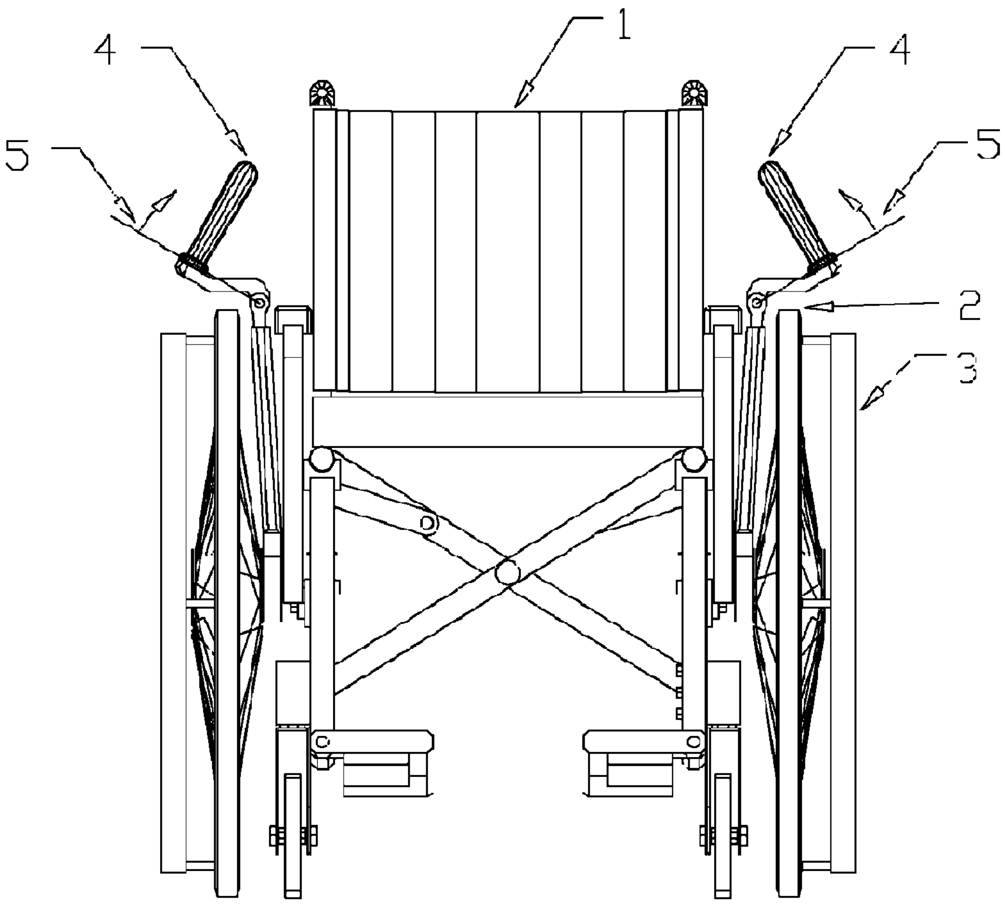
FIG. 2 is a front view of a typical manual wheelchair frame with the lever drive system of this invention installed.

With reference to FIGS. 1 through 3, a typical wheelchair 1 is shown with a preferred embodiment of the wheelchair lever drive system installed on a typical wheelchair frame. It can be seen that propulsion lever assemblies 32 are placed to the inside of rear drive wheels 2. This position is preferable to outside placement as it allows handgrip assemblies 46 to be closer together side-to-side in an ergonomically advantageous position and does not increase the overall width of the wheelchair. It also makes the overall lever drive mechanism aesthetically less obtrusive, a feature shown by independent survey to be important to users. Lever propulsion motion arrows 13 indicate the approximate arc of reciprocating motion that the user would impart to lever assemblies 32 when propelling wheelchair 1.

Figures 3A, 3B, 3C:
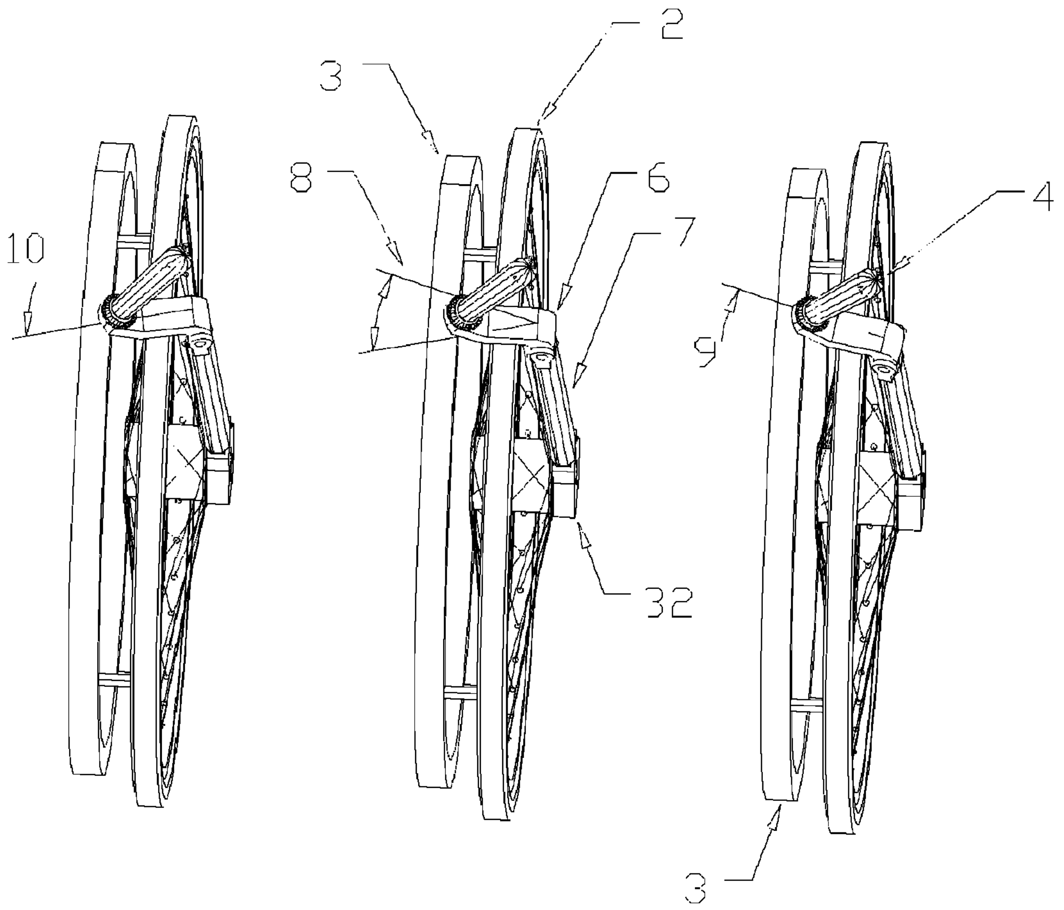
FIG. 3A shows the lever drive shifted from reverse propulsion.
FIG. 3B shows the lever drive system shifted for neutral.
FIG. 3C shows the lever drive system shifted for forward propulsion.

With reference to FIGS. 3A, 3B, and 3C, a wheelchair user would grasp grip 4 and push or pull, thus imparting a propelling motion shown by arrow 13, and could, as desired, impart a directional shift motion shown by circular arrow 8. As shown by arrow 8, the shift motion can be relatively either a CW pivot of grip 4 and grip mount 6 about the long axis of lever 7, or CCW. A CW rotation 9 selects forward propulsion, and a CCW rotation 10 selects reverse propulsion. It may also be understood from this figure that for the user to comfortably shift directions, shift pivot motion 8 must be of small angular excursion so as to not overstress the user's wrist. Inherent to the transmission described in this invention, the handgrip central axis is fixed at an angle to the long axis of lever 7, and offset laterally from the long axis such that pushing force applied to handgrip 4 causes a biasing resultant that tends to maintain the shifting mechanism in forward propulsion position. Conversely, pulling motions tend to maintain reverse propulsion position.

In FIG. 2 and FIG. 5, the braking movement of handgrip 4 and grip mount 6 are shown by curved arrow 5. In a preferred embodiment, braking motion 5 is an inward rotation of handgrip 4 and grip mount 6 about a pivot axis in trunnion 11 placed at the top of lever 7. This placement of grip mount 6 pivot axis causes the weight of the users forearm to impart a pivot motion in the opposite sense of brake motion 5 such that when not actively braking grip 4 and grip mount 6 are returned to a non-braking ready position.

FIG. 4 shows a close-up view of left side lever assembly 32 with some components removed to better illustrate the shifting system. Curved arrow 13 indicates propulsion motion while curved arrow 8 illustrates the pivoting shift motion. Trunnion 11 and shift shaft 27 with associated grip mount 6 and hand grip 4 are rotatably fixed at the top end of lever 7, itself fixed to the top end of lever mount 19 which is removably fixed to clutch cam 23 which is rotatably mounted by rotating bearings in wheel hub 14, not shown. The shifting operations which will be described now can take place simultaneously with propulsion of the wheelchair as depicted by arrow 13. Again with reference to FIG. 4, when forward propulsion is desired, a CW twisting pivot motion applied to handgrip 4 would cause grip mount 6, trunnion 11, and shift shaft 27 to rotate along with pawl 26 which is fixed to the lower end of shift shaft 27. This CW pivot rotation of pawl 26 causes a rotation of clutch cage 24 and associated clutch rollers 25 about the periphery of clutch cam 23 such that propulsion torque resulting in forward motion is transmitted from lever assembly 32 to wheel hub 14, not shown. While shifted as described above, motion of the lever assembly in the opposite direction would result in an overrunning of the clutch described, and allows a return motion of lever assembly 32 to ready it for the next forward propulsion motion.

It may be understood that imparting a CCW twisting pivot shift input motion in place of the CW shift input motion just described will cause torque transmission to be of opposite sense to that described above and result in reverse propulsion. The arrangement is such that the sequence as described above is appropriate for use on both left and right sides of a wheelchair frame.

With reference to FIG. 5 a preferred embodiment of the braking motion of grip 4 and grip mount 6 is illustrated by curved arrow 5. The braking operation which will be described now can take place simultaneously with wheelchair propulsion as depicted by arrow 13. At any time during propulsion or at rest, handgrip 4 and grip mount 6 can be rotated inwardly as shown by arrow 5 such that cable 17 is pulled upwardly through cable sheath 16. Cable sheath 16 is terminated at the upper end by a typical cable sheath socket 36 incorporated into the upper end of lever 7 and at the lower end by a typical cable sheath socket fixed to one of a pair of crossed brake band levers 20. Brake cable 17 is adjustably fixed at the upper end to grip mount 6. See FIG. 7. At the lower end cable 17 is fixed to one of a pair of crossed brake band levers 20. It may be seen, then, that as braking input motion 5 pulls cable 17 upwardly through cable sheath 16, crossed brake band levers 20 are drawn closer together causing brake band 15 to be constricted about the projecting braking portion 33 of wheel hub 14, thus restraining rotation of wheel hub 14 relative to lever assembly 32.

FIGS. 6A, 6B, and 6C illustrate the operation of the bidirectional clutch assembly of the invention. Note that FIG. 4 illustrates the connection of grip 4 and grip mount 6 to clutch cam 23. In FIG. 6A moveable clutch cage 24 is rotated slightly CCW from neutral such that rollers 25 are placed to transmit CW torque from clutch cam 23, indicated by dotted lines as a 12 sided polygon, to wheel hub 14. In FIG. 6B clutch cage 24 is shown in a neutral position such that torque is not transmitted in either direction, and wheel hub 14 can turn independently of lever assembly 32. In FIG. 6C clutch cage 24 is shown shifted slightly CW from neutral such that rollers 25 are placed to transmit CCW torque from clutch cam 23 to wheel hub 14.

FIG. 7 shows the upper end of flexible brake cable 17 with cable end button 35 terminated in cable adjuster 12 axially adjustable within grip mount 6. In a preferred embodiment, cable adjuster 12 comprises a socket with an outside threaded portion and an inside hole with a slot by which cable 17 and cable end button 35 can be installed. Cable sheath 16 is shown terminated in upper cable socket mount 36. Rotation of threaded cable adjuster 12 in grip mount 6 results in axial movement of cable 17 such that brake band 15 can be adjusted for proper operation.

Figures 8A, 8B:
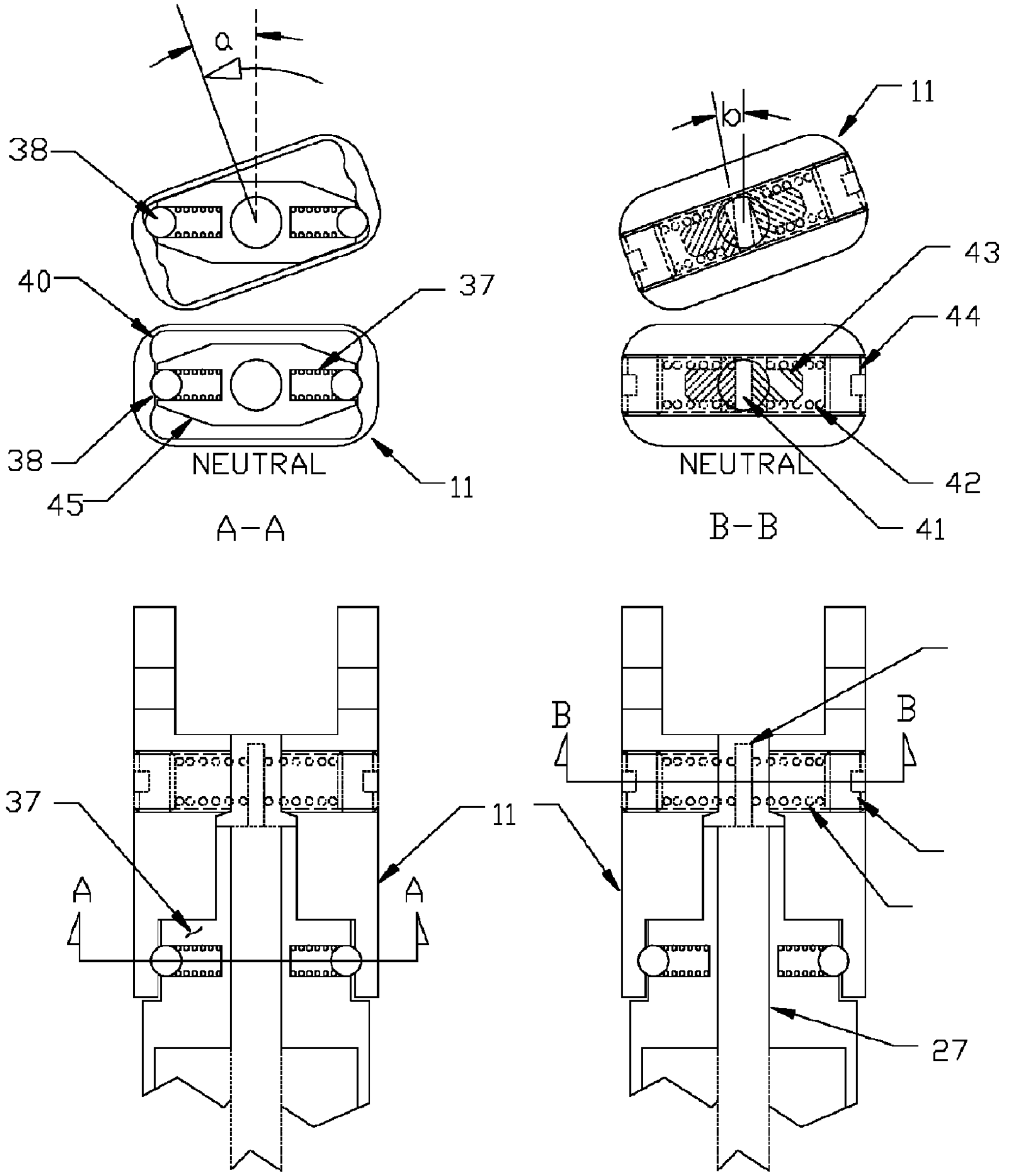

With reference to FIG. 8A, a centerline cutaway about the long axis of lever assembly 32 shows the trunnion rotation limiter arrangement. Also in FIG. 8A are shown view A-A crosswise cutaway sections illustrating the shifting components first in a neutral position and then with trunnion 11 rotated through the full trunnion excursion "a". A shift detent mechanism is provided that will bias the shifting mechanism to maintain either forward or reverse propulsion positions. The twisting pivot motion describes allows the detent to be overcome such that a shift to different propulsion mode can be effected. Shift detent balls 38 urged by associated shift detent springs 39 engage a plurality of shift detents 40. Detents 40 are provided corresponding to reverse, neutral, and forward shift positions. In view A-A detent ball 38 can be seen engaged in center position detent 40 by spring 39, thus holding trunnion 11 in a center position corresponding to neutral. In upper view A-A trunnion 11 is shown rotated through angle "a" about cylindrical trunnion arbor portion 37 and is held in that position by the engagement of ball 38 in the associated corner detent 40. Trunnion arbor portion 37 also incorporates angled flank portions 45 act to limit the rotational excursion of trunnion 11 to angle "a". In FIG. 8B shift shaft 27 with flatted tang portion 41 is shown with associated shift overtravel compensator springs 42 placed to either side. Springs 42 are retained and adjustably compressed by adjusting screws 44. Spring buttons 43 may optionally be employed to ameliorate the contact between the face of springs 42 and shift shaft tang 41. In view B-B of FIG. 8B, are shown crosswise section views depicting the shifting components first in a neutral position and then with trunnion 11 rotated through the full trunnion excursion "a". In this view the angle necessary to accomplish shifting of reversible clutch cage 24 from neutral to either forward or reverse is indicated at "b". Angles "a" and "b" are chosen such that "b" is less than "a" so that rotation of trunnion 11 through angle "a" will first rotate shift shaft 27 through angle "b" and then further rotation of trunnion 11 will cause shift overtravel compensator springs 43 to be compressed. This compression of springs 43 has the effect of making the interaction of the shifting components less critical, and to protect the shifting components from the high forces applied to the hand grip and lever assembly during propulsion. It also has the effect of causing trunnion 11, when detented at angle "a", to maintain a spring generated torque reaction on tang portion of 41 of shift shaft 27. This torque applied to shift shaft 27 has the effect of maintaining a controlled torque which acts to urge clutch cage 34 such that it is firmly but compliantly maintained in either reverse or forward position.

What is claimed is:

1. A wheelchair drive mechanism for manual propulsion of wheelchairs comprising: a wheel; a hub mounting said wheel; a propulsion lever assembly rotatably mounted to said hub incorporating means for selecting the operative mode, either forward propulsion, freewheeling of the hub with respect to the lever, or reverse propulsion, and means for causing braking; a clutch assembly interposed between said lever and said hub incorporating means of causing pivoting motions of said lever to propel said wheelchair either in forward or reverse directions; a braking mechanism by which the speed of rotation of said wheel can be slowed or stopped; whereby a user may manually propel a wheelchair; wherein said means for selecting the operative mode comprises a trunnion, a shift shaft placed within the propulsion lever, a means of operatively connecting said trunnion with said shift shaft, and a bi-directional clutch assembly.

2. The drive mechanism of claim 1 wherein the said propulsion lever assembly comprises a hand grip assembly, a shift detent mechanism, and a bi-directional clutch assembly.

3. The drive mechanism of claim 2 wherein said hand grip assembly is rotatably mounted at the top of said lever assembly.

4. The drive mechanism of claim 3 wherein the long axis of a hand grip is fixed off-axis from said hand grip assembly rotation axis.

5. The drive mechanism of claim 1 wherein said trunnion incorporates a detent mechanism with a plurality of detent positions.

6. The drive mechanism of claim 1 wherein said clutch assembly comprises a bi-directional roller clutch incorporating a cam and a moveable roller cage.

7. The drive mechanism of claim 1 wherein said shift shaft incorporates a pawl which operatively connects with said bi-directional clutch moveable roller cage.

8. The drive mechanism of claim 1 wherein the means for operatively connecting said trunnion with said shift shaft comprises one or more springs with associated adjustment screws placed operatively between said trunnion and said shift shaft.

9. The drive mechanism of claim 1 wherein said braking mechanism comprises said hand grip, a hand grip mount, a braking means, a flexible cable operatively connected between said hand grip and said braking means, and a cable adjusting means.

10. The drive mechanism of claim 9 wherein said cable adjusting means comprises a moveable cable socket.

11. The drive mechanism of claim 9 wherein said braking means comprises a band type brake.

12. The drive mechanism of claim 11 wherein said band brake acts upon a portion of said wheel hub.

* * * * *